UNITED STATES PATENT OFFICE.

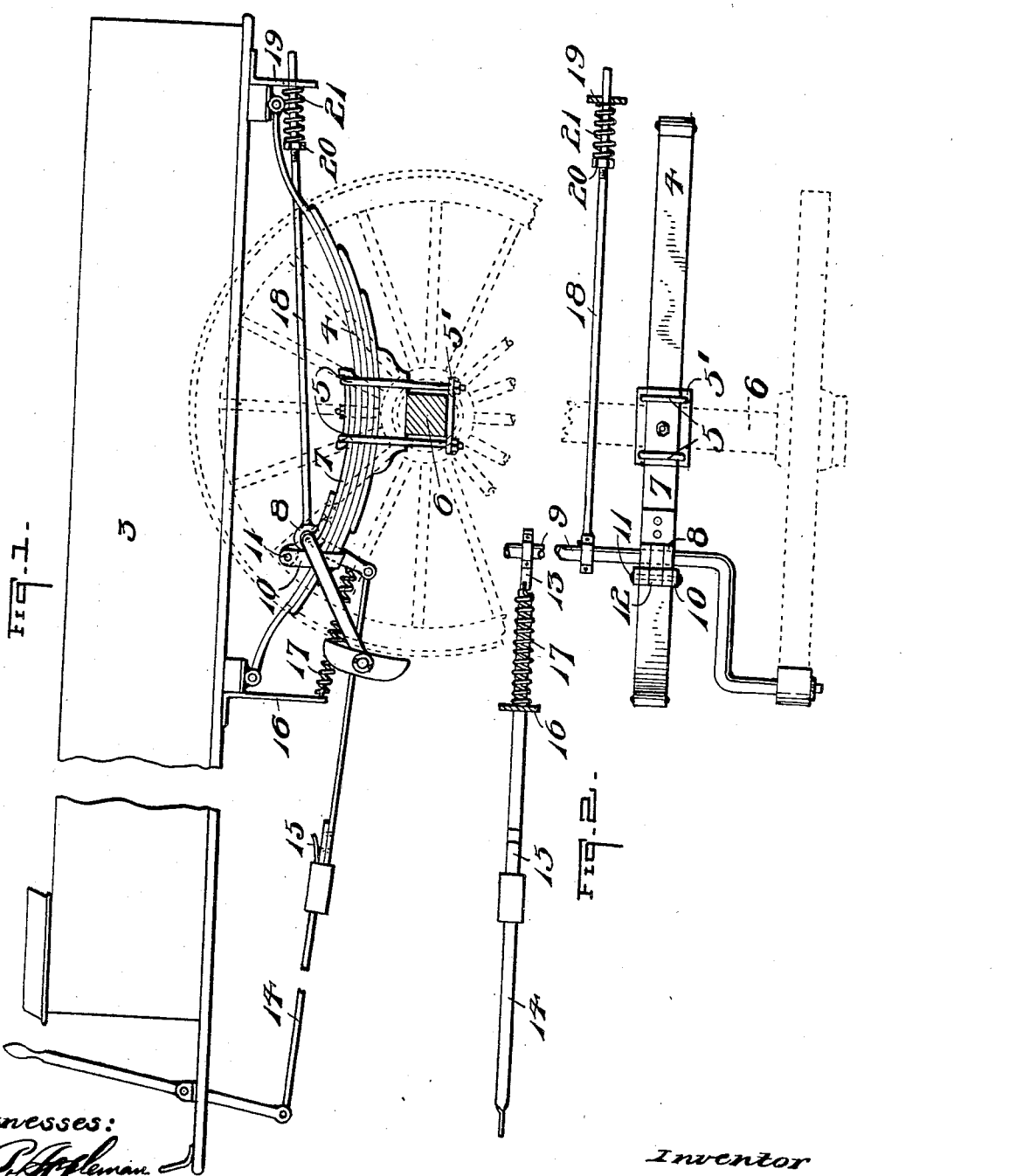

JOHN G. EBKEN, OF PITTSBURG, PENNSYLVANIA.

VEHICLE-BRAKE.

No. 813,545.      Specification of Letters Patent.      Patented Feb. 27, 1906.

Application filed May 18, 1905. Serial No. 261,002.

*To all whom it may concern:*

Be it known that I, JOHN G. EBKEN, a citizen of the United States of America, residing at Pittsburg, in the county of Allegheny and State of Pennsylvania, have invented certain new and useful Improvements in Vehicle-Brakes, of which the following is a specification.

My invention relates to an improvement in brakes, and more particularly to those used on carriages, wagons, and the like. In this style of brakes I dispense with the old method of fastening the brake-hanger to the body of vehicle and instead attach it to the spring, as by this arrangement the brake will always be in the same relative position when pressure is applied to the wheel.

With the foregoing and other objects in view the invention consists in the details of construction and in the arrangement and combination of parts, to be hereinafter more fully set forth and claimed.

In describing the invention in detail reference will be had to the accompanying drawings, forming part of the specification, wherein like characters denote corresponding parts in both views, and in which—

Figure 1 is a side view of my improved brake as applied to a vehicle. Fig. 2 is a top plan view thereof.

Referring to the accompanying drawings, 3 is a fragmentary view of a vehicle, showing my improved device as applied. Springs 4 are secured to the axle by U-shaped bolts 5, clamped to a plate 5' on the under face of the axle 6. These straps also fit over the brake-strap 7, which is bent over, as at 8, to form a bearing for the brake-shaft 9.

In order to prevent the brake-strap from rising—that is, in case the vehicle backs when brakes are applied would raise the same—to overcome this, I use a stirrup 10. This surrounds the spring and will not allow the brake-strap an upward thrust under those conditions, and pivotally mounted in stirrup on pin 11 is a hinged strap 12, the other end of which fits around the brake-shaft 9.

Arranged at any suitable distance on the brake-shaft is a crank-arm 13. This is connected to the operating-rod 14 and is provided with an adjusting means 15 for the purpose of increasing or diminishing the movement of rod 14. Connecting crank-arm 13 with bracket 16 is a retracting-spring 17. This normally draws the brake-shoe away from coming into contact with wheel, as shown in dotted lines.

Another feature I employ in connection with my improved brake is to prevent the forward thrust of the vehicle-body when the brake-shoes are applied. This I accomplish by using a rod 18, that loosely fits around the brake-shaft 9, the other end working through a bracket 19, and interposed between the bracket and adjusting-nut 20 is a buffer-spring 21. It will be readily seen when the vehicle-body is thrust forward by a sudden stop the bracket, being secured to the vehicle-body, will compress the buffer-spring against adjusting-nut 20, not only overcoming the sudden jar, but forcing the body back to its normal position.

Having fully described the invention, what I claim as new, and desire to secure by Letters Patent, is—

1. The combination of a brake, an operating-rod connecting to a crank-arm of brake-shaft, brake-strap secured to spring, and means for preventing the forward thrust of vehicle-body, substantially as described.

2. The combination of a brake, an adjustable operating-rod pivotally connected to a crank-arm, said crank attached to a retracting-spring, a brake-strap normally held flat by a stirrup, substantially as described.

In testimony whereof I affix my signature, in the presence of two witnesses, this 5th day of May, 1905.

JOHN G. EBKEN.

Witnesses:
    JOHN NOLAND,
    W. G. DAVIS.